US011328147B1

(12) United States Patent
Ahmed et al.

(10) Patent No.: US 11,328,147 B1
(45) Date of Patent: May 10, 2022

(54) IDENTIFYING ITEM BARCODES

(71) Applicant: Amazon Technologies, Inc., Seattle, WA (US)

(72) Inventors: Ejaz Ahmed, Marlborough, MA (US); Oded Maron, Sudbury, MA (US); Jeremy S. De Bonet, Southborough, MA (US); Daniel Ron, Somerville, MA (US); Sajjad Beygiharchegani, Cambridge, MS (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/213,031

(22) Filed: Mar. 25, 2021

Related U.S. Application Data

(63) Continuation of application No. 16/455,030, filed on Jun. 27, 2019, now Pat. No. 10,963,659.

(51) Int. Cl.
| | |
|---|---|
| *G06K 7/14* | (2006.01) |
| *G06T 7/11* | (2017.01) |
| *G06K 9/62* | (2006.01) |

(52) U.S. Cl.
CPC ......... *G06K 7/1443* (2013.01); *G06K 7/1413* (2013.01); *G06K 7/1456* (2013.01); *G06K 9/6256* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,963,659 B1 * | 3/2021 | Ahmed | G06K 9/00771 |
| 2013/0284806 A1 | 10/2013 | Margalit | |
| 2019/0318417 A1 * | 10/2019 | Gumaru | G06K 7/1413 |

OTHER PUBLICATIONS

Non Final Office Action dated Aug. 17, 2020 for U.S. Appl. No. 16/455,030, "Identifying Item Barcodes", Ahmed, 5 pages.

* cited by examiner

*Primary Examiner* — Kristy A Haupt
(74) *Attorney, Agent, or Firm* — Lee & Hayes, P.C.

(57) ABSTRACT

This disclosure describes using trained classifiers and additional data to identify items placed into a tote. The techniques may use a first classifier on image data representing an item to determine a region associated with a barcode of the item and may use one or more second classifiers to analyze the region for determining a candidate barcode. The techniques may then determine whether the candidate barcode corresponds to the actual barcode of the item. If so, the techniques may update a virtual cart associated with a user account to indicate the acquisition of the item. If not, then the techniques may use the additional data for identifying the item. For example, the techniques determine a current location of a tote for determining items that are within a threshold distance of the location and may use this information, along with the candidate barcode, to identify the item placed into the tote.

20 Claims, 8 Drawing Sheets

IDENTIFYING ITEM BARCODES

RELATED APPLICATIONS

This application claims priority to and is a continuation of U.S. patent application Ser. No. 16/455,030, filed on Jun. 27, 2019, the entire contents of which are incorporated herein by reference.

BACKGROUND

Materials handling facilities, such as warehouses or retail stores, often provide users with totes (e.g., carts, baskets, etc.) to facilitate the processes by which the users locate, identify, retrieve, and transport items at the facilities. For example, when a user identifies an item that he or she desires on a shelf or other location within a materials handling facility, the user may remove the item from the shelf or other location and place the item into a receptacle of a tote before the user continues to travel through the facility in search of additional items.

Traditionally, when the user has finished identifying and retrieving the items he or she desires, the user may transport the items in the tote to a check-out destination within the materials handling facility, such as a distribution station, a cashier, or a dedicated self-checkout stand, and transition the items to a human operator or an automated agent. Typically, the user or the human operator manually removes the items from the tote, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the tote. Therefore, traditional methods for acquiring items some materials handling facilities often require users to load items into their totes, remove the items from the tote for payment, and return the items to the totes and/or other item carriers for transporting the items to another location, such as the users' automobiles or homes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates a flow diagram of an example process for identifying an item using a candidate character string determined by one or more trained classifiers and additional data, such as a location of a tote in a facility, a list associated with a user, and/or the like.

FIG. 7 illustrates a flow diagram of another example process for identifying an item using a candidate character string determined by one or more trained classifiers and additional data, such as a location of a tote in a facility, a list associated with a user, and/or the like.

DETAILED DESCRIPTION

Figure 1:
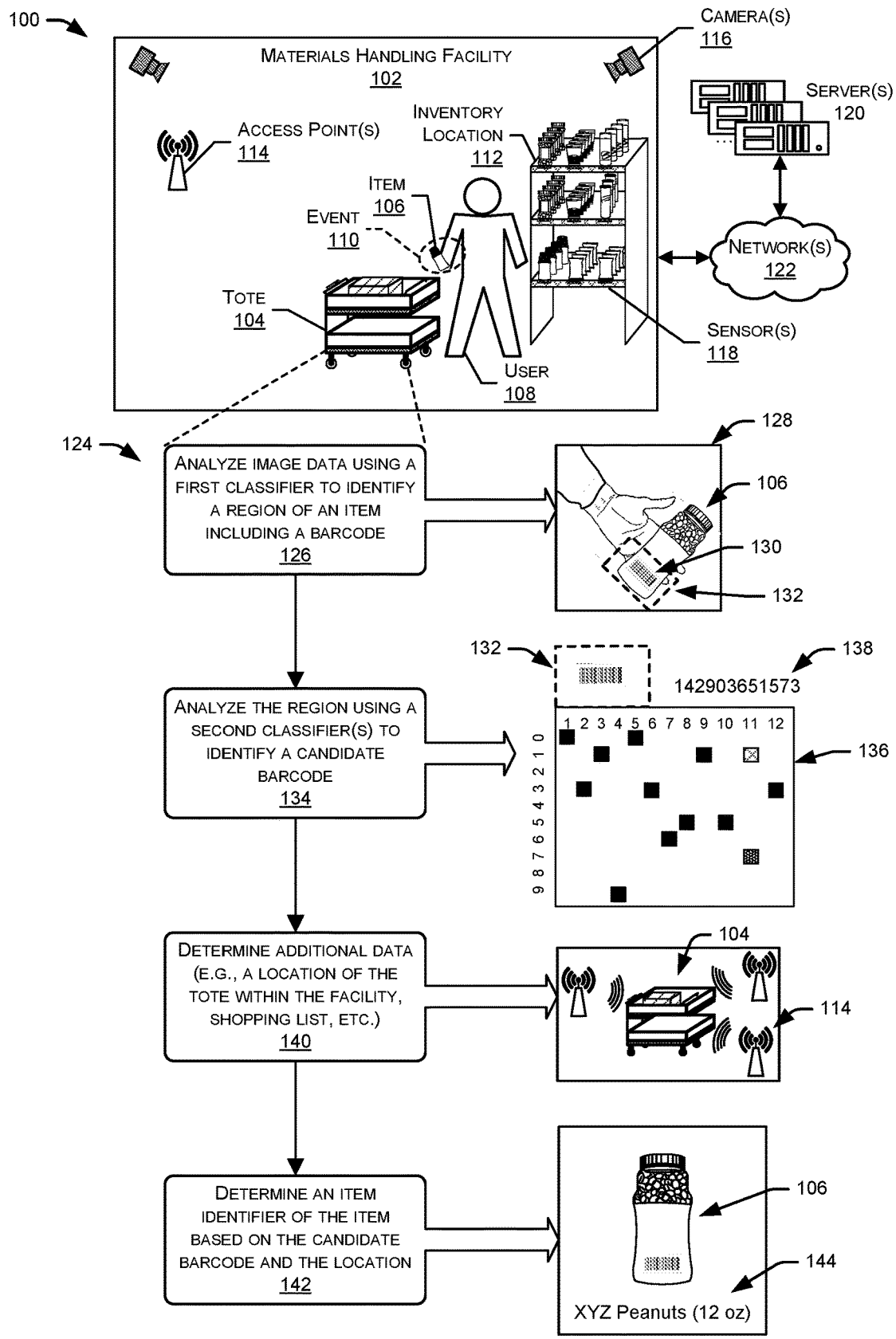
FIG. 1 illustrates an example environment of a materials handling facility that includes an item-identifying tote to identify items placed into, and removed from, the tote. The tote may capture image data of an item being placed into the tote and may use one or more trained classifiers on the image to determine a candidate barcode associated with the item. In some instances, the tote may use information in addition to the candidate barcode, such as a location of the tote within the facility at a time when the item was placed into the tote, for identifying the item.

This disclosure is directed to, in part, using trained classifiers and, in some instances, additional data to identify items that are placed into a tote (e.g., basket, cart, or other receptacle) that may be utilized by users in material handling facilities as the users move around the material handling facilities. The techniques described herein may use a first classifier on image data representing an item to determine a region associated with a barcode of the item and may use one or more second classifiers to analyze the region for determining one or more candidate barcodes. The techniques may then perform one or more processes for determining when the candidate barcode corresponds to the actual barcode of the item. If so, the techniques may update a virtual cart (or item listing) associated with a user account to indicate the acquisition of the item. If the process(es) are unable to determine that the candidate barcode corresponds to the actual barcode of the item, then the techniques may use the additional data for identifying the item. In one of many examples, the techniques determine a current location of tote into which the item was placed for determining items that are within a threshold distance of the location. This information, along with candidate items determined using the candidate barcode, may be used to determine the identity of the item placed into the tote.

Traditionally, facilities that offer items (or products) for acquisition by users may provide users with traditional shopping carts that have a durable frame, including or supporting a basket, multiple wheel castors configured to allow the cart to move on a surface, and handle for users to push the tote around in a facility. These facilities often offer other types of totes, such as hand baskets to store items as the user moves around the store. While these totes are useful for storing items on behalf of users during their shopping session, they result in additional effort for the users during a traditional checkout experience. For example, users must first retrieve items from shelves or other storage locations and place the items into the tote, and second, the users must remove the items from the tote, have the items scanned, and then placed back into a bag or other item carrier. These intervening actions that are required to transition items from a shelf or other storage location into the bags or other item carrier necessarily slows the process by which items are retrieved from a materials handling facility and tend to mitigate the advantages that totes provide.

The techniques described herein generally include the use of item-identifying totes that may be utilized by users in material handling facilities to automatically identify items that the users place in their totes as they move around the material handling facilities. Upon identifying items, the item-identifying totes may update virtual item listings for the users to represent the items that have been placed in, or removed from, the physical totes. According to the techniques described herein, an item-identifying tote (or "smart tote") may include one or more cameras coupled to the tote to generate image data representing items that a user places in the tote, and/or removes from the tote. The tote may include one or more components (e.g., software component(s), hardware processor(s), etc.) that analyze the image data to determine an item identifier for the item(s) placed in the tote, or removed from the tote, and update a virtual item listing for the user of the tote. Once a user has finished their shopping session, the user may be able to efficiently check-out of the facility without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual item listing of the user that were identified by the tote during the user's shopping session.

In some instances, a tote described herein may include one or more cameras configured to acquire image data of an item being placed into, or removed from, the tote. In other instances, a facility may include one or more overhead cameras, one or more in-shelf cameras, and/or one or more other cameras configured to acquire the image data of the item. Regardless of the origin of the image data, the techniques described herein may utilize a localization component that applies a first trained classifier to the image data to identify a region of the image data that represents a barcode of the item. That is, the first classifier may be trained to identify which portion(s) of image data depict some or all of a barcode or other predefined identifying information printed on an item. After identifying a region of the image data that depicts the barcode, the localization component may provide an indication of the region to a reader component. For example, the localization component may provide coordinates of the bounding box, the image data corresponding to the region itself, and/or other information to the reader component.

In some instances, prior to analyzing the region depicting the region, the reader component or another component may align the identified barcode with a predefined alignment. For example, if the barcode is rotated in the image data at a certain angle, the reader component or another alignment component may rotate the image data to account for the angle. After the image data (or the region of the image data) is aligned, the reader component may apply one or more second trained classifiers to the region of the image data to identify (i.e., read) the barcode. That is, the barcode printed on the item may correspond to an alphanumeric string of characters, such as a string of six or twelve numeric digits. Thus, the one or more second classifiers may attempt to identify each character represented by the barcode.

In some instances, the barcode may correspond to a predefined number of characters, such as a string of twelve characters (e.g., numerical digits, 0-9). In these instances, the reader component may comprise a number of trained classifiers corresponding to the predefined number of characters of the barcode. For example, if a barcode includes twelve "slots", or locations associated with a character in the string of characters, the reader component may utilize twelve trained classifiers, each of which may be trained to determine the character represented in the corresponding slot. For example, a first classifier may be configured to identify the character represented in a first slot, a second classifier may be configured to identify the character represented in the second slot, and so forth. The reader component may then generate a candidate character string corresponding to the barcode based on the output of these trained classifiers. For example, the output of the example twelve trained classifiers may be combined to generate the candidate character string.

In some instances, each of the trained classifiers comprise a multi-class classifier trained to identify each of the potential characters in each respective slot. For example, in instances where the barcode of the item corresponds to a string of numerical digits, each of the second trained classifiers may be configured to determine whether the respective slot of the barcode represents each of the ten possible digits zero (0) through nine (9). In some instances, each trained classifier may generate a probability distribution indicating a respective probability that the slot of the barcode represents one of the respective digits. For example, a first classifier of the reader component may be configured to generate a probability distribution indicating a first probability that a first slot of the barcode represents zero (0), a second probability that the second slot represents one (1), and so forth (up to a tenth probability that the first slot represents nine (9)). In some instances, the reader component then determines, for each slot of the barcode, the digit having the highest probability and may generate the candidate character string corresponding to the barcode based on these highest-probability digits. In some instances, the reader component may generate an n-list of candidate character strings based on the described probability distributions.

After identifying one or more candidate character strings, such as a twelve-digital numerical string, corresponding to the barcode as determined by the reader component, the reader component or another component may perform one or more processes for evaluating whether the candidate character string corresponds to the actual barcode printed on the item. For example, the reader component may mathematically compute a check digit using a first portion of the candidate character string (e.g., the first eleven digits) and may compare this check digit to a second check digit (e.g., the twelfth digit of the candidate character string). If the first check digit matches the second check digit, the reader component or another component may determine that the candidate character string correctly identifies the barcode printed on the item and, thus, may determine an item identifier associated with this barcode. The reader component, or another component, may then store the item identifier in association with an account of the user. For example, a virtual cart associated with the user may be updated to indicate the addition of the item to the virtual cart. In addition, or in the alternative, the reader component or other component may perform one or more other verification processes prior to determining that the candidate character string is correct, such as verifying that the product identified by the string resides at the facility, and/or the like.

In instances where the first check digit does not match the second check digit, meanwhile, a correction component may utilize additional information for identifying the item. For example, the correction component may receive additional data, such as data indicating a location of the tote into which the item was placed, data indicating items on a shopping or other type of list of the user, data indicating current contents of the virtual cart (and tote) of the user, data indicating a current time of day or season, data indicating a geographical region of the facility, data indicating a transaction history of the user, data indicating current sales or promotions at the facility, and/or the like.

In one example, the tote or another system may be configured to generate data indicative of a location of the tote within the facility. In some examples, the tote may include one or more sensors configured to generate sensor data that may be analyzed to approximate the location of the tote in the facility. For instance, the tote may include sensors such as one or more network interfaces to emit and/or detect wireless signals (e.g., WiFi®, Bluetooth®, etc.) that may be used to identify a location of the tote. The tote may receive wireless signals and determine, based on which access point(s) in the facility emitted the wireless signals and/or a signal strength of the received signal(s) (RSSI), the location of the tote in the facility. In other examples, the sensors may generate sensor data indicating radio frequency identifiers (RFIDs) emitted from RF emitters around the facility, and the tote may analyze the sensor data to determine the location of the tote based on which RF emitter transmitted a detected signal with an RFID.

After determining the location of the tote at the time corresponding to the item being placed into, or removed from, the tote, the correction component may determine an item identifier of the item based at least in part on the candidate character string and the additional information. For example, the correction component, or another component, may determine a first subset of items in the facility based at least in part on the candidate character string. For example, the correction component, or other component, may determine those items in inventory at the facility having respective barcodes having a similarity to the candidate character string that is greater than a threshold similarity. For example, the correction component may determine those items available at the facility whose barcodes have a certain number of digits in common with the candidate character string, such as 50% of the digits, 80%, or the like. In still other instances, the correction component may determine a top-n number of items having barcodes with the highest respective similarities to the candidate character string (e.g., the top one hundred items, ten items, etc.).

In addition, the correction component may identify a second subset of items based at least in part on the additional data, such as the location of the tote in the facility. In one example, the correction component may determine the second subset of items by determining those items within a threshold distance of the tote in the facility at the time of the item being placed in the tote (e.g., ten feet, one hundred feet, etc.). To do so, the correction component may analyze planogram data storing respective indications of the locations of items in the facility to identify those items that are associated with a location that is within the threshold distance of the location of the tote. In other instances, the correction component may determine a top-n list of items closest to the location of the tote (e.g., the closest ten items, the closest one hundred items, etc.). In addition, the correction component may also take into account (by refining one or both of the subsets of items and/or by creating additional subset(s)) preferences of the user, a transaction history of the user, demographic data associated with the user, and/or the like.

After identifying the first subset of items based on the candidate character string and the second subset of items based on the additional data (e.g., location data), the correction component may identify the item placed into the tote with reference to both subsets. For example, the correction component may identify any items that appear in both subsets. If a single item appears in both subsets, then the correction component may determine that this is the item and may determine and store an item identifier of this item in association with a virtual cart of the user. If multiple items appear in these subsets, then the correction component may cause identification of the item using still other algorithms or techniques. For example, additional data may be analyzed (e.g., users preferences, transaction history, etc.), data may be passed to human users for analysis (e.g., video data, image data, etc.), and/or the like.

To utilize a smart tote as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or totes, can recognize the user. For instance, the user may have registered to identify themselves to the tote using any identification technique, such as presenting an identification means to a camera/scanner (e.g., presenting a driver's license, presenting a facility-issued card, presenting a user identifier via a mobile phone, etc.), speaking a predefined utterance (e.g., a name of the user, a predefined keyword, etc.), and/or looking into a camera for facial recognition. Once a user has identified themselves to a smart tote or another device in the facility, the user may begin a shopping session where the smart tote identifies and tracks items retrieved by the user and placed in the smart tote.

After the user has moved throughout the materials handling facility and selected the items they desire to purchase or otherwise take from the facility, the user may end the shopping session in various ways. For instance, the user may return a tote to a tote corral or other storage location, provide input to the tote indicating an end of the shopping session (e.g., utterance, utilize a user interface element on a touch display, etc.), or simply remove bags or other item carriers from the tote and leave the facility. After the user has ended their shopping session, the list of item identifiers in the virtual item listing may be uploaded to one or more remote servers that manage user accounts for users of the facility. The servers may charge the appropriate user account for the listing of the items in the virtual item listing that the user took from the facility.

Although some of the techniques described below are performed locally on the tote, in other examples, some or all of the techniques may be performed by one or more backend devices or servers associated with the facility. For instance, the sensor data and/or image data may be collected at the tote and sent over network(s) to backend devices at the facility, or server devices located remote from the facility, to be processed remotely. However, in some instances it may be advantageous for at least some of the processing to be performed on the tote to reduce latency in identifying items placed in the tote. For instance, it may be advantageous to have low latency when requesting that a user provide feedback to help identify an item recently placed in the tote, rather than the user continuing their shopping session and being asked later about an item. Further, while various techniques described below are with reference to purchasing items in a retail facility, the techniques are generally applicable to any materials handling facility in which a user may place items in a tote. For example, although the techniques described herein are primarily with reference to identifying items placed in a tote by a user for the purpose of identifying a user account to charge for items selected from a materials handling facility, the techniques are equally applicable to any industry in which user recognition may be helpful. For instance, the idem-identifying tote may be implemented for distribution centers where employees collect items from various locations to be shipped through the mail system.

In some instances, the techniques may be performed with traditional totes, carts, or baskets that do not include any sensors or electronics at all. For instance, the facilities themselves may include sensors such as weight sensors, cameras, etc., that send sensor data and image data to backend devices to perform the techniques described herein. The backend devices may analyze the sensor data and/or image data using the cascading algorithms as described herein, and maintain a virtual item listing for the users in the facility.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/ or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes an item-identifying tote 104 to identify items 106 placed in, and removed from, the tote 104 by a user 108. The tote 104 uses one or more trained classifiers, operating on image data, potentially in addition to other information associated with the shopping session to determine an item identifier and update a virtual item listing (or "virtual cart") using the item identifier. The tote uses one or more cameras and/or sensors to detect an item 106, generate image data depicting the item 106, analyzes the image data and additional data to determine an item identifier for the item 106, determine an event 110 involving the item (e.g., add to tote, remove from tote, multiple items, quantity of items, etc.) and update a virtual item listing using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the tote 104 (e.g., shopping tote). The inventory location 112 may house one or more different types of items 106 and the user 108 may pick (i.e., take, retrieve, etc.) one of these items 106.

Upon entering a facility 102, a user 108 may desire to utilize a tote 104 for their shopping session to transport items 106 around the facility 102 during their shopping session. In such examples, the user 108 may approach a cart corral, basket stack, or other tote storage location at which totes 104 are stored. In some examples, a tote corral may comprise a structure, such as an aisle, for storing nested totes. Generally, two or more of the totes may be configured to nest or otherwise functionality join with one another, so that the totes may be easily stored in a tote corral, and/or transported in bulk. In some examples, the tote corral may provide additional functionality beyond storage. For instance, the tote corral may facilitate charging of the nested totes that are in the tote corral. For instance, the tote corral may have various electrical contacts extending along the length of a horizontal and/or vertical member of the corral that, when placed in electrical contact with an electrical contact of the nested totes, charge one or more batteries of the nested totes. In other examples, power cords may extend from the tote corral that may be plugged into the nested totes to recharge batteries of the nested totes while not in use.

To utilize a tote 104, a user 108 may approach an unused tote that is not currently engaged in a shopping session (e.g., a stored tote), and interact with the unused tote 104 to identify themselves to the tote 104 and begin a shopping session. For instance, the totes 104 may include sensors, such as a barcode sensor (e.g., an image sensor such as a camera, photodetector, or other sensing apparatus designed to read a one or two-dimensional barcode) such that when a user 108 presents a user device, or portion thereof, such as the display, to the barcode sensor, the tote 104 may identify the user and corresponding user account for a shopping session. Other types of interaction may be performed by a user 108 to identify themselves to a tote 104 (e.g., uttering a name or other keyword to identify the user 108, presenting the user's face for facial recognition, typing in a password or other user information into a display of the tote 104, and/or any other type of user identification technique).

Once a user has identified themselves to the tote 104, the item-identifying functionality of the tote 104 may be activated such that subsequent items 106 placed in the tote 104 will be identified by the tote 104 and added to a virtual item listing for the user 108. In some instances, however, the tote 104 and/or additional systems in communication with the tote 104 may be configured to identify the items placed into, or removed from, the tote 104 without the need for the user 108 to specifically scan the respective items or otherwise perform any actions other than simply place the items into, or remove the items from, the tote. Stated otherwise, the tote 104 and/or the systems may be configured to identify the items in response to the user interacting with the items in the same manner as if the tote 104 include sensors or no item-identification logic.

As illustrated, a user 108 may move the tote 104 around the facility 102 to one or more inventory locations 112. The user 108 may retrieve items from the inventory location 112 and place the items 106 in the tote 104. Additionally, the use 104 may retrieve items 106 from the tote 104 and put the items 106 back in an inventory location 112, such as when the user 108 changes their mind regarding their desire to purchase or otherwise acquire the item 106. The tote 104 may include various components for identifying item identifiers corresponding to the items 106 placed in the tote and maintaining a virtual item listing for the shopping session of the user 108.

In some instances, the facility 102 may include various sensors configured to interact with the tote 104 and/or generate sensor data in addition to, or as an alternative to, the sensor data generated by the tote 104. For instance, the facility 102 may include one or more access points 114 configured to emit signals (e.g. WiFi, Bluetooth Beacons, etc.) that are detected by the tote 104 for use in determining the location of the tote 104 in the facility 102. Further, the facility 102 may include one or more camera(s) 116 configured to generate image data that depicts the facility 102, such as the events 110 occurring in the facility, items 106 involved in the events, and/or users 108 that selected the items 106. Further, the facility 102 may include one or more weight sensors 118 disposed in the inventory locations 112 to detect generate sensor data indicative of the removal of, or return of, items 106 from the inventory locations 112. The facility 102 may include one or more backend devices or servers, and/or may transmit the data to the servers 120 at a remote location, for analysis using the techniques described herein. That is, the techniques described herein may be performed entirely by the tote 104 using sensor data and image data generated by sensors of the tote, entirely by backend devices/servers of the facility 102 (or remote servers) using sensor data and image data generated by the tote, entirely by backend devices/servers of the facility 102 (or remote servers) using sensor data and image data generated by sensors in the facility, and/or any combination thereof.

FIG. 1 illustrates a process 124 that the tote 104 and/or another system(s) may perform for identifying an item placed into, or removed from, the tote 104. To begin, an operation 126 may include analyzing image data 128 using a first classifier to identify a region 132 of the image data 128 including a barcode 130. For example, one or more cameras (e.g., on the tote 104, overhead mounted on a ceiling, etc.) may generate image data 128 corresponding to an item, such as an item being picked by the user 108 from an inventory location 112, placed into the tote 104, or the like. Some or all of this image data may be analyzed using the first classifier (or set of multiple first classifiers) for identifying a portion of the image data depicting some or all of an item identifier of an item 106, such as the barcode 130 or any other type of machine-readable code. For example, the first classifier may have been trained using supervised learning techniques, where the training data included labeled image data depicting barcodes and indicating the location of these barcodes and/or labeled image data that did not depict a barcode.

The first classifier may determine the region(s) 132 of the image data 128 depicting the barcode 130 and may provide this information to one or more second classifiers. It is to be appreciated that this information may comprise an indication of a bounding box and an identifier of the image data to which the bounding box corresponds, the image data within the bounding box itself, and/or the like. Further, it is to be appreciated that the image data 128 may comprise multiple pieces of image data captured by one or more cameras and, thus, the information provided to the one or more second classifiers may identify multiple regions associated with multiple pieces of image data.

At an operation 134, the tote 104 may analyze the identified region (or regions) using one or more second classifiers to identify a candidate barcode. That is, the second classifier(s) may be configured to analyze the portion of the image data 128 corresponding to the region 132 to identify at least one candidate barcode 138 that may correspond to the barcode 130 itself. In some instances, the second classifier(s) generate a probability distribution 136 indicating respective probabilities of the possible values of each slot of the barcode 130. For example, in instances where the barcode 130 comprises a string of numerical digits, the probability distribution 136 may determine a respective probability that the respective slot corresponds to a respective digit zero through nine. For example, the probability distribution 136 may indicate a probability that the first slot corresponds to zero, a probability that the first slot corresponds to one, and so forth. In some instances, the probability distribution 136 may represent these respective probabilities for each slot of the barcode 130. If, for instance, the barcode has twelve slots (e.g., locations associated with numerical digits), then the probability distribution 136 may indicate a respective probability of each digit within each of the twelve slots. In some instances, the operation 134 may utilize an equal number of second classifiers as the barcode 130 has slots. For instance, twelve classifiers may be used to identify the respective probabilities of the numerical digits for each of the twelve slots of the barcode 130.

The candidate barcode 138 may be generated based on the numerical digit having the highest respective probability in each slot. FIG. 1, for instance, illustrates that the candidate character string corresponds to "142903651573", based on the example probability distribution 136. It is noted that the respective classifier for each of the slots one through ten, as well as slot twelve, has determined the identity of the numerical value of the respective slot with a very high probability. The classifier associated with the eleventh slot, however, has determined that this slot is likely associated with a value of one (1) or a value of seven (7). However, the classifier has determined seven to be associated with a higher probability and, thus, the candidate barcode 138 corresponds to this value. It is to be appreciated, however, that in some instance the tote 104 may generate multiple candidate barcodes for use in identifying the item 106.

In some instances, the candidate barcode 138 may be used alone to identify the item. For example, the tote 104 may determine whether the candidate barcode 138 corresponds to an item available at the facility 102 and/or whether the candidate barcode is a valid barcode causing a virtual cart of the user 108 to be updated to reflect the event 110 associated with the item corresponding to the candidate barcode 138. For example, if the tote 104 determines that the candidate barcode 138 is a valid barcode for an item available at the facility 102, and if the tote 104 determines that the user 108 placed the item into the tote 104, then the tote 104 may cause a virtual cart associated with the user to be updated to reflect this addition.

In other instances, however, the tote 104 may use one or more pieces of additional data for determining the identity of the item. At an operation 140, for example, the tote 104 may determine additional data, such as a location of the tote 104 within the facility 102, one or more items on a list associated with the user 108, previous items purchased by the user 108, items often acquired when items currently in the tote 104 of the user 108 are in other users' totes, a current time of day, items recently provided to the facility, and/or any other additional information that may be used to determine the item. In the example of utilizing the location of the tote, the facility 102 may include respective access points 114 for use in identifying the location of the tote 104 within the facility. Again, however, this location data may additionally, or alternatively, be determined in a variety of ways.

At an operation 142, the tote 104 may determine an item identifier of the item 106 based at least in part on the candidate barcode 138 and the additional data. For example, the tote 104 may determine a first set of candidate items from the candidate barcode 138 and a second set of candidate items from the location and may cross-reference these two candidate sets to identify the item 106 and update a virtual cart of the user to reflect the item identifier and the event. In one example, the tote 104 may determine that an item occurs in both sets of candidate items and may designate this item as the item 106 placed into the tote. In other instances, additional or alternative information may be used to identify the item, such as a candidate set of items appearing on a shopping list of the user 108, a candidate set of items previously purchased by the user 108, a candidate set of items often bought at the current time of day, a candidate set of items often acquired when items currently in the tote 104 of the user 108 are in other users' totes, and/or the like.

In other instances, the candidate barcode 138 and the additional data may be input to generate a list of items ordered by the likelihood that each listed item corresponds to the identified item. That is, the candidate barcode may result in a list of items arranged by corresponding likelihood, while the additional data may be used to further modify the arrangement of the list. In some instances, the top-ranked item from the list may be identified as the item acquired by the user 108, assuming that the corresponding confidence level is greater than a threshold confidence level.

In each of these instances, the tote 104 may cause a virtual cart associated with the user 108 to be updated. For example, an item identifier 144 may be determined and stored in association with the virtual cart. It is to be appreciated that the item identifier may comprise a name of the item, a numerical identifier of the item, and/or, in some instances, the string of characters corresponding to the barcode 130 of the item. Stated otherwise, determining the item identifier may comprise determining the string of the barcode 130 or determining a different identifier associated with the string of the barcode 130.

Once the user 108 has finished their shopping session, the user 108 may end the shopping session in various ways. For instance, the user 108 may return the tote 104 to the tote corral or other storage location, provide input to the tote 104 indicating an end of the shopping session (e.g., utterance, utilize a user interface element on a touch display, etc.), or simply remove item bags or other item carriers from the tote 104 and leave the facility 102. After the user 108 has ended their shopping session, the virtual listing 144 of item IDs 136 in the virtual item listing may be uploaded to one or more remote servers 120, over one or more networks 122, that manage user accounts for users 108 of the facility 102. The server(s) 120 may charge the appropriate user account for the items 106 in the virtual listing 144 that the user 108 took from the facility 102. For instance, the server(s) 120 may be configured to determine or generate information indicative of a cost of the items 106 picked by the user 108, including the appropriate tax. Additionally, the server(s) 120 may store payment information (e.g., credit card information, bank account information, etc.) for each user account. In this way, when the user 108 finished their shopping session and the tote 104 sends the listing 144 of item IDs 136 over the network(s) 122 to the server(s) 120, the server(s) 120 may be configured to determine a cost or price for all of the listed item IDs 136, and charge the user 108 via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The tote 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the tote 104. While the servers 120 are illustrated as being in a location outside of the facility 102, in other implementations, at least a portion of the servers 122 may be located at the facility 102.

Figure 2:
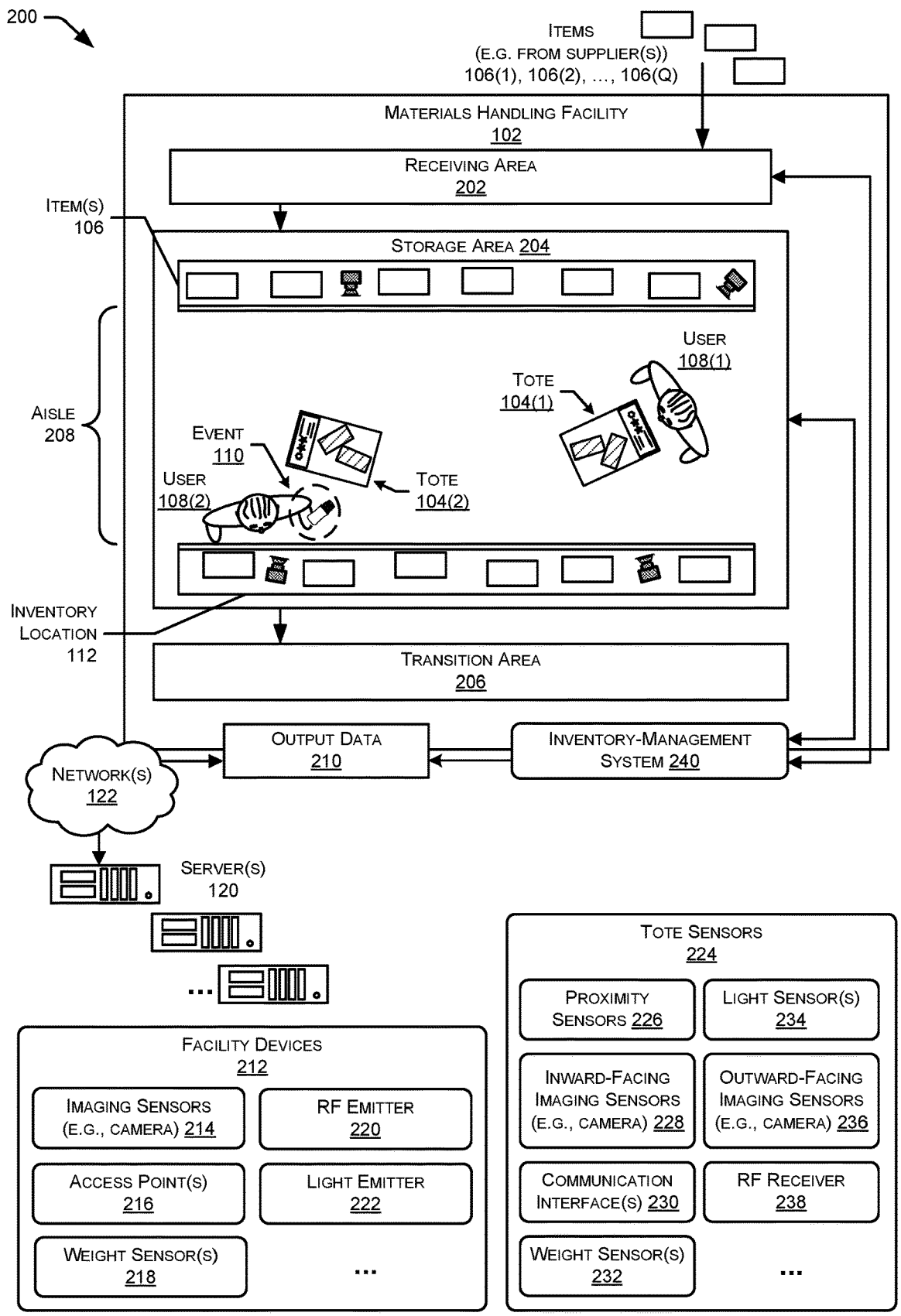
FIG. 2 is a block diagram of an example materials handling facility that includes item-identifying totes, facility and tote sensors, and a tote management system configured to generate output regarding events occurring in the tote using sensor data.

FIG. 2 is a block diagram 200 of an example materials handling facility 102 that includes item-identifying totes 104, facility and tote sensors, and an inventory-management system 124 configured to generate output regarding events occurring in the tote 104 using sensor data. However, the following description is merely one illustrative example of an industry and environment in which the techniques described herein may be utilized. It is to be further appreciated that the inventory-management system may reside within the facility 102, remote from the facility 102, or a combination thereof. For example, in some instances components described with reference to the inventory-management system may reside on computing devices at the facility, at the tote 104, and at the servers 120.

An implementation of a materials handling facility 102 configured to store and manage inventory items is illustrated in FIG. 2. A materials handling facility 102 (facility) comprises one or more physical structures or areas within which one or more items 106(1), 106(2), . . . , 106(Q) (generally denoted as 106) may be held. As used in this disclosure, letters in parenthesis such as "(Q)" indicate an integer result. The items 106 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 202, a storage area 204, and a transition area 206. The receiving area 202 may be configured to accept items 106, such as from suppliers, for intake into the facility 102.

For example, the receiving area 202 may include a loading dock at which trucks or other freight conveyances unload the items 106.

The storage area 204 is configured to store the items 106. The storage area 204 may be arranged in various physical configurations. In one implementation, the storage area 204 may include one or more aisles 208. The aisles 208 may be configured with, or defined by, inventory locations 112 on one or both sides of the aisle 208. The inventory locations 112 may include one or more of shelves, racks, cases, cabinets, bins, floor locations, or other suitable storage mechanisms for holding or storing the items 106. The inventory locations 112 may be affixed to the floor or another portion of the facility's structure or may be movable such that the arrangements of aisles 208 may be reconfigurable. In some implementations, the inventory locations 112 may be configured to move independently of an outside operator. For example, the inventory locations 112 may comprise a rack with a power source and a motor, operable by a computing device to allow the rack to move from one location within the facility 102 to another.

One or more users 108(1), 108(2), . . . , 108(U), totes 104(1), 104 (2), . . . , 104 (T) (generally denoted as 104) or other material handling apparatus may move within the facility 102. For example, the users 108 may move about within the facility 102 to pick or place the items 106 in various inventory locations 112, placing them on the totes 104 for ease of transport. An individual tote 104 is configured to carry or otherwise transport one or more items 106. For example, a tote 104 may include a basket, a cart, a bag, and so forth. In other implementations, other agencies such as robots, forklifts, cranes, aerial drones, and so forth, may move about the facility 102 picking, placing, or otherwise moving the items 106.

One or more sensors may be configured to acquire information in the facility 102. The sensors in the facility 102 (e.g., facility devices 212) may include sensors fixed in the environment (e.g., ceiling-mounted cameras) or otherwise, such as sensors in the possession of users (e.g., mobile phones, tablets, etc.) or sensors mounted on the totes 104 (e.g., tote sensors 224). The facility sensors 212 may include imaging sensors 214 (e.g., cameras), weight sensor(s) 218, and/or other sensors. The tote sensors 224 may include proximity sensors 226 to detect items 106 being placed in the tote 104, inward-facing imaging sensors 228 to identify items 106 being placed in the tote, communication interfaces 230, weight sensors 232 (e.g., in the bottom of the tote), light sensors 234, outward facing sensors 236, radio frequency (RF) 238, temperature sensors, humidity sensors, vibration sensors, and so forth. The sensors may be, in some examples, in or on the tote 104 or another location in the facility 102. In one example, the bottom of the totes 104 may include weight sensors configured to determine a weight of the items 106 placed thereupon.

During operation of the facility 102, the sensors may be configured to provide information suitable for identifying the movement of items 106 or other occurrences within the tote 104. For example, a series of images acquired by a camera 228/236 may indicate removal of an item 106 from a particular tote 104 by one of the users 108 and/or placement of the item 106 on or at least partially within one of the totes 104.

While the storage area 204 is depicted as having one or more aisles 208, inventory locations 112 storing the items 106, sensors, and so forth, it is understood that the receiving area 202, the transition area 206, or other areas of the facility 102 may be similarly equipped. Furthermore, the arrangement of the various areas within the facility 102 is depicted functionally rather than schematically. For example, multiple different receiving areas 206, storage areas 208, and transition areas 210 may be interspersed rather than segregated in the facility 102.

The totes 104 may include, or be coupled to, an inventory-management system 124. The inventory-management system 124 is configured to identify interactions with and between users 108 and totes 104, in one or more of the receiving area 202, the storage area 204, or the transition area 206. These interactions may include one or more events 110. For example, events 110 may include placing of an item 106 in a tote 104, returning of an item 106 from the tote 104 to an inventory location 112, and so forth. Other events 110 involving users 108 may include the user 108 providing authentication information in the facility 102, using a computing device at the facility 102 to authenticate identity to the inventory-management system 124, and so forth.

By determining the occurrence of one or more of the events 110, the inventory-management system 124 may generate output data 210. The output data 210 comprises information about the event 110. For example, where the event 110 comprises an item 106 being removed from, or placed in, a tote 104, the output data 210 may comprise an item identifier indicative of the particular item 106 that was removed from, or placed in, the tote 104, a quantity of the item 106, a user identifier of a user that removed the item 106, and/or other output data 210.

The inventory-management system 124 may use one or more automated systems to generate the output data 210. For example, an artificial neural network or other automated machine learning techniques may be used to process the sensor data and/or image data from the one or more sensors to generate output data 210. The automated systems may operate using probabilistic or non-probabilistic techniques. For example, the automated systems may use a Bayesian network. In another example, the automated systems may use support vector machines to generate the output data 210 or the tentative results. The automated systems may generate confidence level data that provides information indicative of the accuracy or confidence that the output data 210 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 35%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 106 may be compared with a set of previously stored images. Differences between the image data and the previously stored images may be assessed. For example, differences in shape, color, relative proportions between features in the images, and so forth. The differences may be expressed in terms of distance with a mathematical space.

For example, the color of the object as depicted in the image data and the color of the object as depicted in the previously stored images may be represented as coordinates within a color space.

The confidence level may be determined based at least in part on these differences. For example, the user 108 may pick an item 106(1) such as a peanut bottle that is generally cylindrical in shape from the inventory location 112. Other items 106 at nearby inventory locations 112 may be predominately spherical. Based on the difference in shape (cylinder vs. sphere) from the adjacent items, and the correspondence in shape with the previously stored image of the peanut bottle item 106(1) (cylindrical and cylindrical), the confidence level that the user 108 has picked up the peanut bottle item 106(1) is high.

In some situations, the automated techniques may be unable to generate output data 210 with a confidence level above a threshold result. For example, the automated techniques may be unable to distinguish which item 106 in large a group of items a user 108 has picked up from the inventory location 112 and placed in the tote 104. In other situations, it may be desirable to provide human confirmation of the event 110 or of the accuracy of the output data 210. For example, some items 106 may be deemed age restricted such that they are to be handled only by users 108 above a minimum age threshold.

In instances where human confirmation is desired, sensor data associated with an event 110 may be processed to generate inquiry data. The inquiry data may include a subset of the sensor data associated with the event 110. The inquiry data may also include one or more of one or more tentative results as determined by the automated techniques, or supplemental data. The subset of the sensor data may be determined using information about the one or more sensors. The subset of the sensor data may include images that may show the item 106 being placed in, or removed from, the tote 104. The subset of the sensor data may also omit images from other cameras that did not have that item 106 in the field of view. The field of view may comprise a portion of the scene in the tote 104 that the camera is able to generate sensor/image data about.

Continuing the example, the subset of the sensor data may comprise a video clip acquired by one or more cameras having a field of view that includes the item 106. The tentative results may comprise the "best guess" as to which items 106 may have been involved in the event 110. For example, the tentative results may comprise results determined by the automated system that have a confidence level above a minimum threshold.

The facility 102 may be configured to receive different kinds of items 106 from various suppliers and to store them until a customer orders or retrieves one or more of the items 106. A general flow of items 106 through the facility 102 is indicated by the arrows of FIG. 2. Specifically, as illustrated in this example, items 106 may be received from one or more suppliers, such as manufacturers, distributors, wholesalers, and so forth, at the receiving area 202. In various implementations, the items 106 may include merchandise, commodities, perishables, or any suitable type of item 106, depending on the nature of the enterprise that operates the facility 102. The receiving of the items 106 may comprise one or more events 110 for which the tote management system 124 may generate output data 210.

Upon being received from a supplier at receiving area 202, the items 106 may be prepared for storage. For example, items 106 may be unpacked or otherwise rearranged. An inventory management system of the facility 102 may include one or more software applications executing on a computer system to provide inventory management functions based on the events 110 associated with the unpacking or rearrangement. These inventory management functions may include maintaining information indicative of the type, quantity, condition, cost, location, weight, or any other suitable parameters with respect to the items 106. The items 106 may be stocked, managed, or dispensed in terms of countable, individual units or multiples, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 202, items 106 may be stored within the storage area 204. In some implementations, like items 106 may be stored or displayed together in the inventory locations 112 such as in bins, on shelves, hanging from pegboards, and so forth. In this implementation, all items 106 of a given kind are stored in one inventory location 112. In other implementations, like items 106 may be stored in different inventory locations 112. For example, to optimize retrieval of certain items 106 having frequent turnover within a large physical facility 102, those items 106 may be stored in several different inventory locations 112 to reduce congestion that might occur at a single inventory location 112.

When a customer order specifying one or more items 106 is received, or as a user 108 progresses through the facility 102, the corresponding items 106 may be selected or "picked" from the inventory locations 112 containing those items 106. In various implementations, item picking may range from manual to completely automated picking. For example, in one implementation, a user 108 may have a list of items 106 they desire and may progress through the facility 102 picking items 106 from inventory locations 112 within the storage area 204 and placing those items 106 into a tote 104. In other implementations, employees of the facility 102 may pick items 106 using written or electronic pick lists derived from customer orders. These picked items 106 may be placed into the tote 104 as the employee progresses through the facility 102. Picking may comprise one or more events 110, such as the user 108 in moving to the inventory location 112, retrieval of the item 106 from the inventory location 112, and so forth.

After items 106 have been picked, they may be processed at a transition area 206. The transition area 206 may be any designated area within the facility 102 where items 106 are transitioned from one location to another or from one entity to another. For example, the transition area 206 may be a packing station within the facility 102. When the item 106 arrives at the transition area 206, the items 106 may be transitioned from the storage area 204 to the packing station. Information about the transition may be maintained by the tote management system 124 using the output data 210 associated with those events 110.

In another example, if the items 106 are departing the facility 102 a list of the items 106 may be used by the tote management system 124 to transition responsibility for, or custody of, the items 106 from the facility 102 to another entity. For example, a carrier may accept the items 106 for transport with that carrier accepting responsibility for the items 106 indicated in the list. In another example, a customer may purchase or rent the items 106 and remove the items 106 from the facility 102.

The inventory-management system 124 may access or generate sensor data about the items 106, the users 108, the totes 104, and so forth. The sensor data may be acquired by one or more of the sensors, data provided by other systems, and so forth. For example, the sensors may include cameras configured to acquire image data of items 106 placed in the totes 104. The image data may comprise still images, video, or a combination thereof. The image data may be processed by the tote management system 124 to determine an item identifier for the items 106, a listing of items in the tote 104 for a user 108, and so forth. As used herein, the identity of the user of a tote 104 may represent a unique identifier of the user (e.g., name, number associated with user, username, etc.), an identifier that distinguishes the user amongst other users being identified with the environment, or the like.

The inventory-management system 124, or systems coupled thereto, may be configured to identify the user 108. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102 and/or interaction with a tote 104. Determination of the user's 216 identity may comprise comparing sensor data associated with the user 108 in the facility 102 and/or with the tote 104 to previously stored user data. In some examples, the output data 210 may be transmitted over a network 226 to server(s) 120.

Figure 3A:
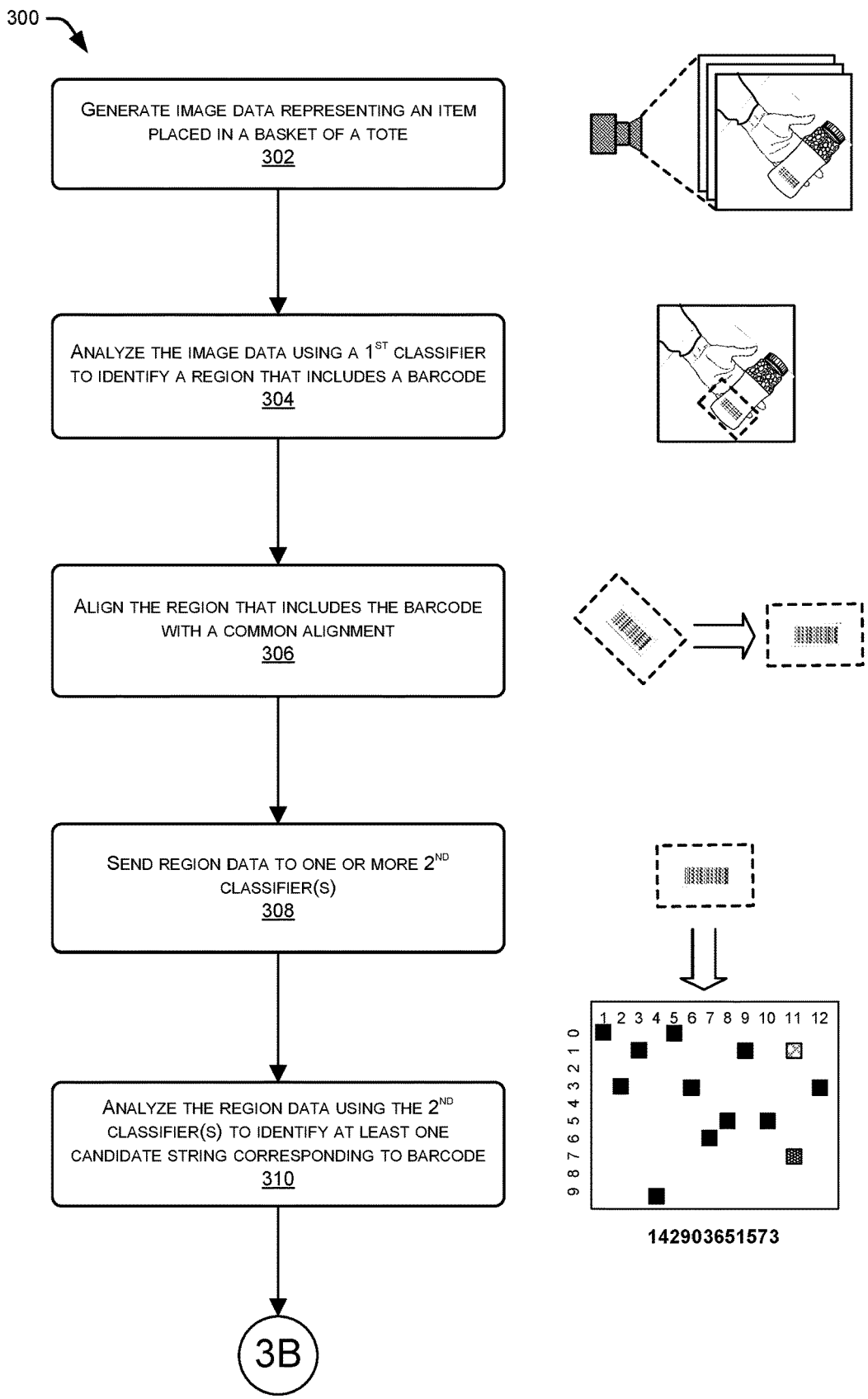
FIGS. 3A and 3B illustrate a flow diagram of an example process for an item-identifying tote to determine an item identifier of an item placed into the tote using one or more classifiers configured to generate a candidate character string corresponding to a barcode of the item, as well as additional data, such as a location of the tote, a shopping list of a user, current contents of the tote, a transaction history of the user, and/or the like FIG. 4 illustrates example components of one or more systems configured to support an inventory-management system. In some instances, the systems may comprise a tote, one or more computing devices within a facility, one or more computing devices that are remote from the facility, and/or a combination thereof.
Figure 3B:
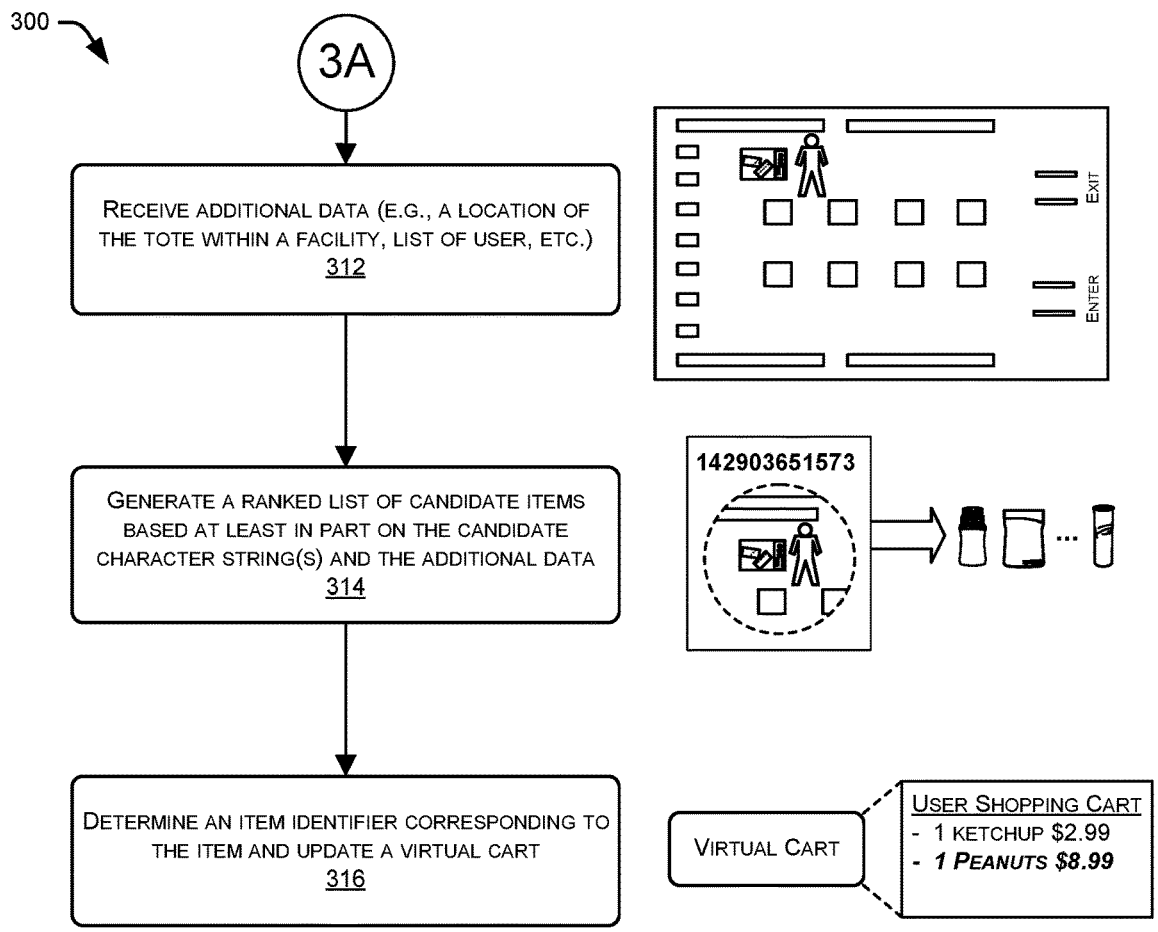

FIGS. 3A and 3B illustrate a flow diagram of an example process 300 for an item-identifying tote to determine an item identifier of an item placed into the tote using one or more classifiers configured to generate a candidate character string corresponding to a barcode of the item, as well as additional data, such as a location of the tote, a shopping list of a user, current contents of the tote, a transaction history of the user, weight data indicating a weight of the item, appearance data indicating an appearance of the item, and/or the like. While described with reference to being performed by the tote 104, in other instances one or more other computing devices may additionally or alternatively perform some or all of the operations.

At an operation 302, the tote 104 may generate image data representing an item being placed in a basket of the tote 104. In some examples, the image data may be data generated by a camera that includes multiple images depicting a two-dimensional view of a field of view of the camera. In other examples, the image data may comprise a three-dimensional (3D) model or representation that includes the item 106.

At an operation 304, the tote 104 analyzes the image data using a first classifier to identify a region of the image data that includes a barcode. The first classifier may comprise an artificial neural network or any other type of classifier that has been trained to identify the presence of a barcode using supervised learning or the like.

At an operation 306, the tote 104 may align the region that includes the barcode with a common alignment. That is, prior to one or more second classifiers analyzing the region of the image data including the barcode, the tote 104 may rotate the region of the image data to match an orientation of the barcodes presented to the second classifiers during training.

At an operation 308, the first classifier sends an indication of the region of the image data to the second classifier(s). As described above, this may include sending the image data and an indication of the region, sending only image data corresponding to the region, sending data indicating the coordinates and the region and data identifying the underlying image data, and/or the like.

At an operation 310, the tote 104 analyzes the identified region of the image data using one or more second classifiers to identify at least one candidate character string corresponding to the barcode. As described above, the second classifiers may comprise a predefined number of classifiers corresponding to a predefined number of slots of the barcode, with each of the classifiers configured to generate a probability distribution for its respective slot. In some instances, the set of second classifiers may have been trained together, such that the first classifier was trained to identify the first slot using the same data that the second classifier was trained with to identify the second slot, and so forth. In some instances, the second classifiers may comprise artificial neural networks or other classifier types having been trained using supervised-learning. The training data for these classifiers may comprise both images having known, labeled, barcode values, as well as synthetic data generated from the real-world images of the known, labeled barcodes.

FIG. 3B continues the illustration of the process 300 and includes, at an operation 312, receiving additional data for identifying the item being placed in the basket of the tote 104. As described above, this additional data may comprise a location of the tote in the facility, items on a list associated with the user, current contents of the tote 104, items recently shipped to the facility, items currently offered for acquisition in the facility, and/or the like. In instances where the additional data comprises the location of the tote, one or more sensors on the tote and/or otherwise in the facility may generate sensor data indicating a location of the tote 104 within a facility 102. For instance, a WiFi sensor/receiver, Bluetooth sensor/receiver, RF receiver, etc., may generate sensor data that can be utilized to determine a location of the tote 104 in the facility 102 (e.g., WiFi triangulation, beaconing, location-specific RF IDs, etc.).

At an operation 314, the tote 104 may generate, based on the candidate character string(s) and the additional data, a list of items ranked according to respective confidence levels each respective item on the list corresponds to the item placed into the basket of the tote 104. For example, the candidate character string(s) and/or the additional data may be passed into a trained classifier that outputs the respective confidence levels representing the similarity between each respective item on the list and the item placed into the tote. The tote 104 may then generate the ranked list based on these values. An individual confidence value associated with an individual item may be based on a similarity between each candidate character string and an item identifier (e.g., barcode value) of the item, a distance between a location of the item in the facility and a location of the tote, whether the item appears on a list associated with the user, and/or the like. Of course, while one example is provided, it is to be appreciated that the tote 104 may compute the similarity in any other number of ways.

At an operation 318, the tote 104 may also determine a second subset of items located within a threshold distance to the location of the tote 104. For instance, the tote 104 may store a planogram for the facility 102, or a planogram (e.g., a diagram or model) that indicates the placement of items 106 on inventory locations 112. The tote 104 may determine, using the location of the tote 104 and the planogram, the set of items located within the threshold distance to the location of the tote 104 (e.g., same aisle, within 10 feet, etc.).

At an operation 320, the tote 104 may determine an item identifier of the item placed into the basket of the tote 104 based at least in part on the first and second subset of items, and a virtual-tote component may update a virtual cart of the user to indicate the addition of the item. In some instances, the determined item identifier may correspond to an item that appears in both the first and second subsets of items. In some instances, the tote 104 may receive still more data for identifying the item, such as information associated with a shopping list of the user, information from a human associate at the facility that viewed the image data, weight data indicating a weight of the item, appearance data indicating an appearance of the item, or the like.

Figure 4:
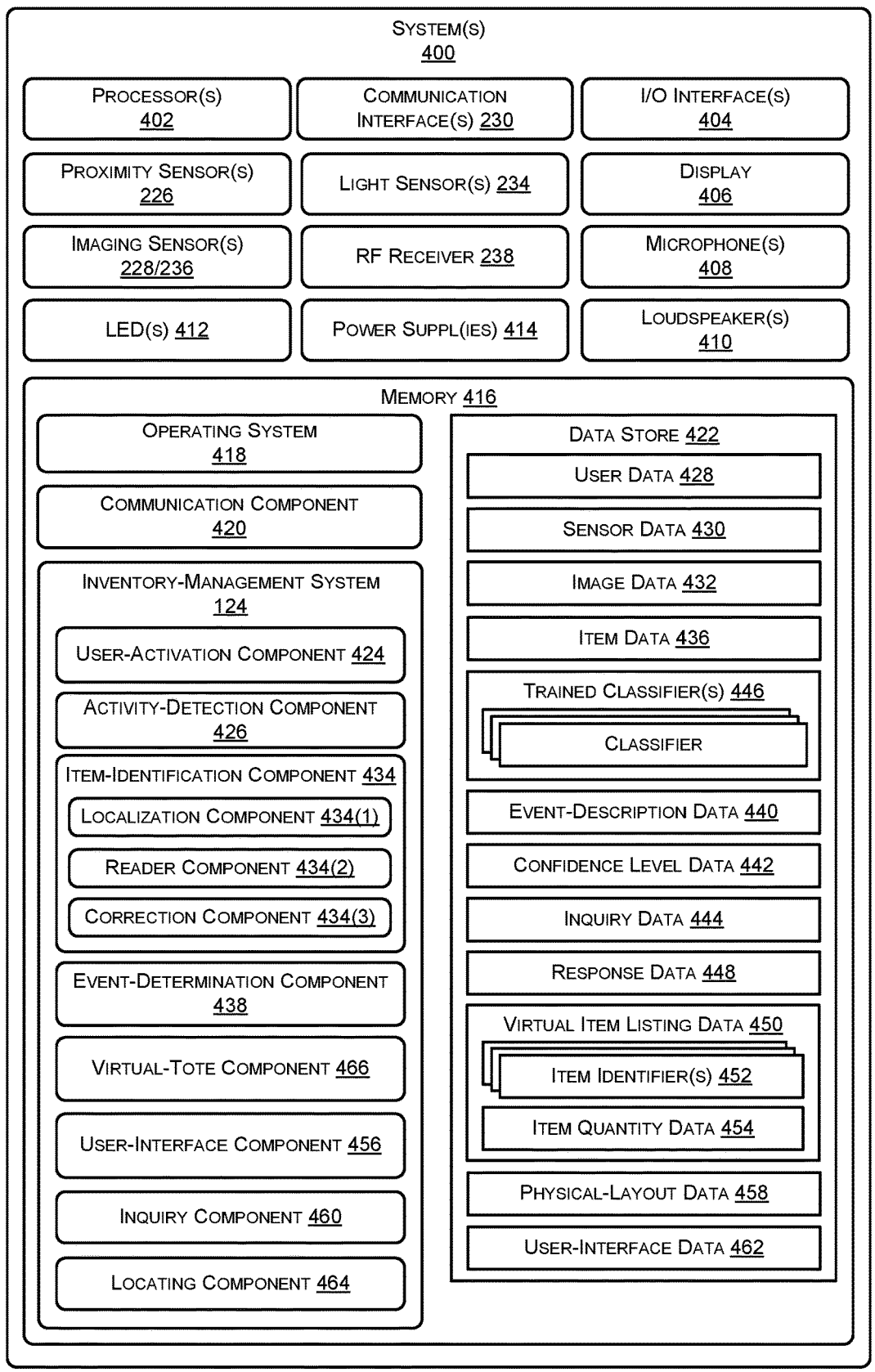

FIG. 4 illustrates example components of one or more systems 400 configured to support an inventory-management system. In some instances, the systems may comprise a tote, one or more computing devices within a facility, one or more computing devices that are remote from the facility, and/or a combination thereof.

The systems 400 may include one or more hardware processors 402 (processors) configured to execute one or more stored instructions. The processors 402 may comprise one or more cores. The systems 400 may include one or more input/output (I/O) interface(s) 404 to allow the processor 402 or other components to communicate with other devices. The I/O interfaces 404 may comprise Inter-Integrated Circuit (I2C), Serial Peripheral Interface bus (SPI), Universal Serial Bus (USB) as promulgated by the USB Implementers Forum, and so forth. The I/O interfaces 404 may allow the various modules/components to communicate with each other and/or control each other.

The systems 400 may also include one or more communication interfaces 230. The communication interfaces 230 are configured to provide communications between devices, such as the tote 104, the server(s) 120, sensors, interface devices, routers, and so forth. The communication interfaces 230 may include devices configured to couple to personal area networks (PANs), wired and wireless local area networks (LANs), wired and wireless wide area networks (WANs), and so forth. For example, the communication interfaces 230 may include devices compatible with Ethernet, Wi-Fi™, Bluetooth®, and so forth. The systems 400 may also include one or more busses or other internal communications hardware or software that allow for the transfer of data between the various modules and components.

The systems 400, such as the tote 104, may also include one or more proximity sensors 408, a camera (or other imaging device 228/236), and one or more LEDs 412. The proximity sensor(s) 408 may comprise any type of sensor that is able to detect the presence of nearby objects without the need for physical contact (e.g., ToF sensors, PIR sensors, etc.). The cameras in each of the capture assemblies may comprise any type of camera or imaging device configured to generate image data (and/or video data), or information descriptive of a plurality of picture elements or pixels. The LED(s) 412 may be selectively activated to emit light at any wavelength, visible or non-visible to users 108.

The systems 400 may include one or more power supply(ies) 414 to provide power to the components. The power supply(ies) 414 may also include a secondary (e.g., internal) power supply to allow for hot swapping of battery pack modules, such as one or more capacitors, internal batteries, etc.

The systems 400, such as the tote 104, may also include a display 406 configured to display image data, such as pictures, videos, user interface elements, and/or any other image data. The display 406 may comprise any type of display 406, and may further be a touch screen to receive touch input from a user 108. The tote 104 may also include one or more microphones 420 and one or more loudspeakers 422 to facilitate a dialogue with a user 108, and/or to receive feedback from the user 108. The microphone(s) 420 may capture sound representing the user's speech, and the loudspeaker(s) 422 may output machine-generated words to facilitate a dialogue, prompt a user 108 for feedback on an item 106 and/or for other information, and/or output other alerts or notifications.

The systems 400 may include one or more memories 416 (e.g., in an electronics box module along with the processor(s) 402). The memory 416 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 416 provides storage of computer-readable instructions, data structures, program modules, and other data for the operation of the systems 400. A few example functional modules are shown stored in the memory 416, although the same functionality may alternatively be implemented in hardware, firmware, or as a system on a chip (SOC).

The memory 416 may include at least one operating system (OS) component 418. The OS component 418 is configured to manage hardware resource devices such as the I/O interfaces 404, the communication interfaces 230, and provide various services to applications or components executing on the processors 402. The OS component 418 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 416. These components may be executed as foreground applications, background tasks, daemons, and so forth. A communication component 420 may be configured to establish communications with one or more of the sensors, one or more of the servers 120, or other devices. The communications may be authenticated, encrypted, and so forth.

The memory 416 may further store the inventory-management system 124. The inventory-management system 124 is configured, in part, to provide the item-identifying functions (and other functions) provided by the tote 104 as described herein. For example, the inventory-management system 124 may be detect items 106, identify items 106, and maintain a virtual item listing for a user 108 of the tote 104.

The inventory-management system 124 may include a user-activation component 424 that performs operations for activating a shopping session using a tote 104 on behalf of a user 108. For instance, a user 108 may have previously registered for a user account with an operator of the facility to utilize various automated management services provided by an operator of the facility 102. The user 108 may have registered for a user account, such as by providing user data 428, to automate payments made for items taken by the user and included a payment means (e.g., credit card, bank account number, etc.), and may have also provided an identification means in the user data 428 to the user-activation component 424 such that the tote 104 can recognize the user 108. For instance, the user 108 may have registered to identify themselves to the tote 104 using any identification technique by the user-activation component 424, such as by providing user data 428 by presenting an identification means to a camera/scanner 228 (e.g., presenting a driver's license, presenting a facility-issued card, presenting a user identifier via a mobile phone, etc.), speaking a predefined utterance that is captured by the microphone(s) 408 (e.g., a name of the user, a predefined keyword, etc.), and/or looking into a camera 228/236 for facial recognition. Once a user 108 has identified themselves to using the user-activation component 424, the user-activation component 424 may open a shopping session where the tote 104 identifies and track items 106 retrieved by the user 108 and placed in the tote 104.

The inventory-management system 124 may additionally include an activity-detection component 426 configured to detect items 106 (or objects) within a particular proximity to the tote. For example, one or more proximity sensor(s) 226 may generate sensor data 430 that indicates a distance between the proximity sensor(s) 226 and any objects located in the FOV of the proximity sensor(s) 228/236. The activity-detection component 426 may analyze the sensor data 430 and determine if an object is within a threshold distance indicating that the object is near the tote 104 and/or within or near the perimeter of the top of the tote 104 (e.g., one foot from the proximity sensor(s) 226, two feet from the proximity sensor(s) 226, etc.). In this way, the proximity sensor(s) 226 may generate sensor data 430 that indicates whether or not an item 106 is being moved in or out of the tote 104. However, in some examples, rather than using sensor data 430 generated by a proximity sensor(s) 226, the activity detection component 426 may utilize image data 432 generated by the camera(s) 228/236 to determine if an object is within a threshold distance from the tote 104.

The inventory-management system 124 may further include a strobing component configured to cause the LED(s) 412 and/or shutters of the camera(s) 228 to strobe according to different frequencies. The LED(s) 412 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 412 to emit light in the visible spectrum. When generating image data 432 using camera(s) 228/236, motion blur may appear when capturing fact moving objects. However, the motion blur may be reduced or eliminated by exposing the camera(s) 228/236 imager for a short (e.g., sub-millisecond) durations. Accordingly, the strobing component may strobe the opening and closing of shutters of the camera(s) 228/236 to limit the sensor exposure duration. Additionally, the strobing component may cause the LEDs to emit/strobe light at a particular frequency.

In some examples, the image data 436 may include 2D representations of the items 106, and/or 3D representations of the items 106. For instance, the imaging sensor(s) 228/236 may include 3D imaging devices or cameras that generate 3D models or representations of the items 106 that are placed in, or removed from, the tote 104. Thus, the image data may include 2D representations and/or 3D representations of the items 106 that may be utilized to identify the items 106 as described herein.

The inventory-management system 124 may also include an item-identification component 434 configured to analyze image data 432 to identify an item 106 represented in the image data 432. The item-identification component 434 may include a localization component 434(1), a reader component 434(2), and a correction component 434(3). In some instances, the localization component 434(1) may utilize a first classifier of trained classifiers 446 stored in the memory 416 to identify a region of image data 436 that includes a barcode, as described above. Thereafter, the reader component 434(2) may use one or more second classifiers of the trained classifiers 446, as described above, to identify one or more candidate character strings corresponding to the barcode. The correction component 434(3) may function to verify the candidate character string(s) and, if they do not appear correct, may use additional information (e.g., location data, list data, etc.) to identify an item identifier of the item.

In some examples, the data store 422 may include physical-layout data 458 that is used by the item-identification component 434 to determine the item 106. The physical-layout data 458 may include or provide a mapping of physical locations within the physical layout of devices and objects such that the location of the tote 104 may be utilized to determine an item 106 stored nearby. The physical-layout data 458 may indicate the coordinates within the facility 102 of an inventory location 112, items 106 stored at that inventory location 112, and so forth. In examples where the tote 104 has location determining sensors (e.g., GPS, RFID, proximity, etc.), the location sensor data may be used to determine where in the store the user 108 is. In such examples, the item-identification component 434 may access the physical-layout data 458 to determine if a location associated with the event is associated with items 106, and confidence levels for the corresponding representations of items in the item data 458. Continuing the example above, given the location within the facility 102 of the event and image camera data, the physical-layout data 458 may determine the items 106 that may have been represented in generated images of the event 110.

The inventory-management system 124 may further include an event-determination component 440 to determine event-description data 460 for the item 106 in the image data 432. The event-determination component 438 may determine if the user 108 is adding an item 106 to the tote 104, removing the item from the tote 104, etc., based on movement of the item 106 and/or whether the item is shown in the image data 432. For instance, if the item 106 is shown as being moved downward towards the interior of the tote 104, and the user's hand 108 then leaves the tote 104 without the item, 106 it can be determined that the user 108 added the item 106 to the tote 104. Similarly, if the user's hand 108 moves into the tote without an item 106 and is depicted in the image data 432 taking an item 106 from the tote, the event-determination component 438 may determine that the user 108 removed an item 106 from the tote 104. In some examples, the event-determination component 438 may analyze a trajectory of the hand of the user 106 to determine, using two or more images representing the hand over time, whether the trajectory of the item 106 is moving into the tote 104, or out of the tote 104.

The inventory-management system 124 may also include a virtual-tote management component 466 configured to manage virtual item listing data 450 for the systems 400. For instance, the virtual-tote management component 442 may utilize the item data 436, event-description data 438, and confidence level data 442 to add item identifier(s) 452 to the virtual item listing data 450 for items 106 that were added to the tote 104, remove item identifier(s) 452 from the virtual item listing data 450 for items 106 that were removed from the tote 104, and track item quantity data 454 indicating quantities of particular items 106 in the tote 104.

The inventory-management system 124 may further include a user-interface component 456 configured to present user interfaces on the display 406 based on user-interface data 462. The user interfaces 462 may include one or more fields to present data, and/or receive touch input (or other input via a keyboard, mouse, etc.) from a user 108. For instance, if the item-identification component 434 is unable to determine an item identifier 452 for an item 106 shown in the image data 432, the user-interface component 456 may receive inquiry data 444 generated by an inquiry component 460 to prompt a user 108 or a human associate at the facility 102 for feedback to help identify the item 106, and/or other information (e.g., if multiple items were placed in the tote 104). The inquiry component 460 may be configured to generate inquiry data 444 based on the information needed to identify the item 106. For instance, the inquiry data 444 may include a prompt to request particular feedback from the user 108 or the associate, such as to provide input (e.g., touch input, vocal/utterance input, etc.) to identify the item 106, input to indicate how many items 106 were added to the tote, input to indicate whether an item 106 was removed or added, etc. In some examples, the user-interface component 456 may present one or more images depicting items from the item data 458 that have the highest confidence levels as corresponding to the item 106 in the image data 436, but confidence levels that are not high enough to make a final decision as to the item 106. For instance, the user-interface component 456 may present pictures of two different items that have high confidence levels 442 and request that the user 108 select or indicate the appropriate item 106. Additionally, or alternatively, the user-interface component 456 may present user-interface data 462 that prompts the user for feedback regarding whether or not the item 106 was added to, or removed from the tote 104.

In some examples, the inventory-management system 124 may further include a locating component 464 configured to determine locations of the tote 104 in the facility 102. For instance, the locating component 464 may analyze sensor data 430 collected by sensors of the tote 104 to determine a location. In some examples, the communication interface(s) 230 may include network interfaces that configured the tote 104 to receive or detect wireless signals (e.g., WiFi signals, Bluetooth signals, etc.) and generate sensor data 430 indicative of the signals. The locating component 464 may analyze the sensor data 430 using various techniques to identify the location of the tote 104, such as WiFi triangulation, received signal strength indicators (RSSI), and/or other methods for analyzing wireless signals to determine a location of the tote 104. In some instances, the facility 102 may include various infrared (IR) or near-IR emitters at different locations that emit light according to frequencies, patterns, etc. that indicate the different locations in the facility 102. In such examples, the tote 104 may utilize a light sensor 234 to generate the sensor data 430 representing the IR or NIR and determine the location of the tote 104 in the facility. In some instances, there may be visible landmarks or markers throughout the facility that indicate a location in the facility, and the locating component 464 may analyze image data 432 generated by an outward facing camera 236 to determine a location of the tote 104. As another example, there may be various radio frequency (RF) emitters positioned throughout the store, and the tote 104 may utilize the RF receiver 238 to allow the locating component 464 to perform RF beaconing to determine the location of the tote 104. The locating component 464 may perform one, or any combination, of the above techniques to determine a location of the tote 104 in the facility 102 and/or any other technique known in the art.

The locating component 464 may perform various operations based on determining the location of the tote 104 within the facility 102. For instance, the locating component 464 may cause user interface data 460 to be presented on the display 406 that includes a map of the facility 102 and/or directions to an item 106 for the user of the tote 104. Additionally, or alternatively, the locating component 464 may utilize the location of the tote, the physical-layout data 456, and/or item data 436 and "push" user interfaces to the display 406 that indicate various location-based information, such as indications of deals for items 106 located nearby, indications of items 106 located nearby and on the user's shopping list, and/or other user interface data 460.

Figure 5:
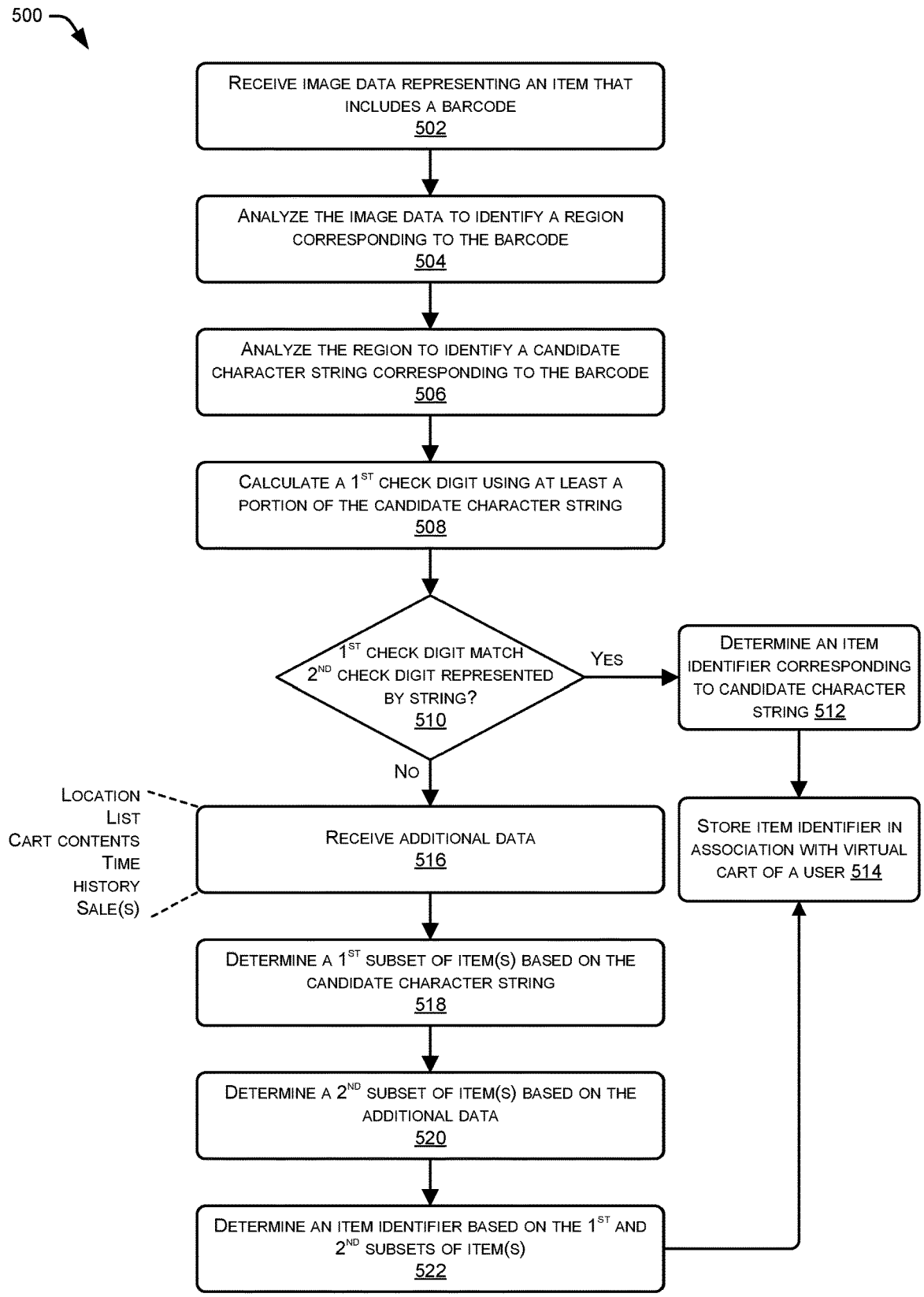

FIG. 5 illustrates a flow diagram of an example process 500 for identifying an item using a candidate character string determined by one or more trained classifiers and additional data, such as a location of a tote in a facility, a list associated with a user, and/or the like. The process 500 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by the tote 104, the servers 120, other computing devices, or a combination thereof.

At an operation 502, a system, such as one or more of the system(s) 400 described above, may receive image data representing an item that includes a barcode. As described above, this image data may be generated by a camera on a tote 104, an overhead camera, a camera on a shelf or other inventory location, or the like. In some instances, this image data comprises images captured over time by multiple cameras, a single camera at a single time, or the like.

At an operation 504, the system may analyze the image data to identify a region of the image data corresponding to the barcode. This may include applying one or more first trained classifiers to the image data, which may have been trained using supervised learning to identify the presence of barcodes in image data.

At an operation 506, the system may analyze the identified region to identify a candidate character string corresponding to the barcode. This may include generating, for each slot of the barcode, a probability distribution indicating a respective probability that the slot represents a character of a predefined number of known characters. In some instances, the system uses one or more second classifiers having been trained using supervised learning to identify a respective probability that each respective slot of a barcode represents a digit from zero (0) to nine (9).

At an operation 508, the system may calculate a first check digit of the candidate character string using at least a portion of the candidate character string. For instance, the first check digit (or "checksum value") may be computed by performing a series of mathematical operations of a first portion of the candidate character string, such as the first eleven digits of the string. At an operation 510, the system queries whether the first check digit matches a second check digit, which may comprise a different portion of the candidate character string such as the last (e.g., twelfth) digit of the string. If the check digits match, then at an operation 512 the system may determine an item identifier corresponding to the candidate character string and, at an operation 514, may store this item identifier in association with a virtual cart of a user. It is to be appreciated that the item identifier may comprise the barcode number, a name of the item, or the like. It is also to be appreciated that the system may perform one or more other checks prior to the operations 512 and/or 514, such as verifying that the item corresponding to the candidate character string is available at the facility in which the user is located.

Furthermore, in some instances the process 500 may refrain from performing the operation 510 but may determine that the candidate character string corresponds to an item offered for acquisition in the facility and, if so, then the process 500 may proceed to the operation 512 and/or 514. In still other instances, the catalog of available items may be input as still more additional data for determining the item corresponding to the acquired item.

If, however, the check digits do not match, then at an operation 516, the system may receive one or more pieces of additional data, such as a location of the tote 104, a shopping list of a user, current contents of the virtual cart of the user, a current time or day or season, a transaction history of the user, current promotions or sales at the facility, weight data indicating a weight of the item, appearance data indicating an appearance of the item, and/or the like. At an operation 518, the system may determine a first subset of items based on the candidate character string. At an operation 520, the system may determine a second subset of items based on the additional data. At an operation 522, the system may determine an item identifier based at least in part on the first and second subsets of items. For example, the system may identify an item that appears in both subsets and may determine an item identifier corresponding to this item. At the operation 514, the system may store the item identifier in association with the virtual cart of the user.

Figure 6:
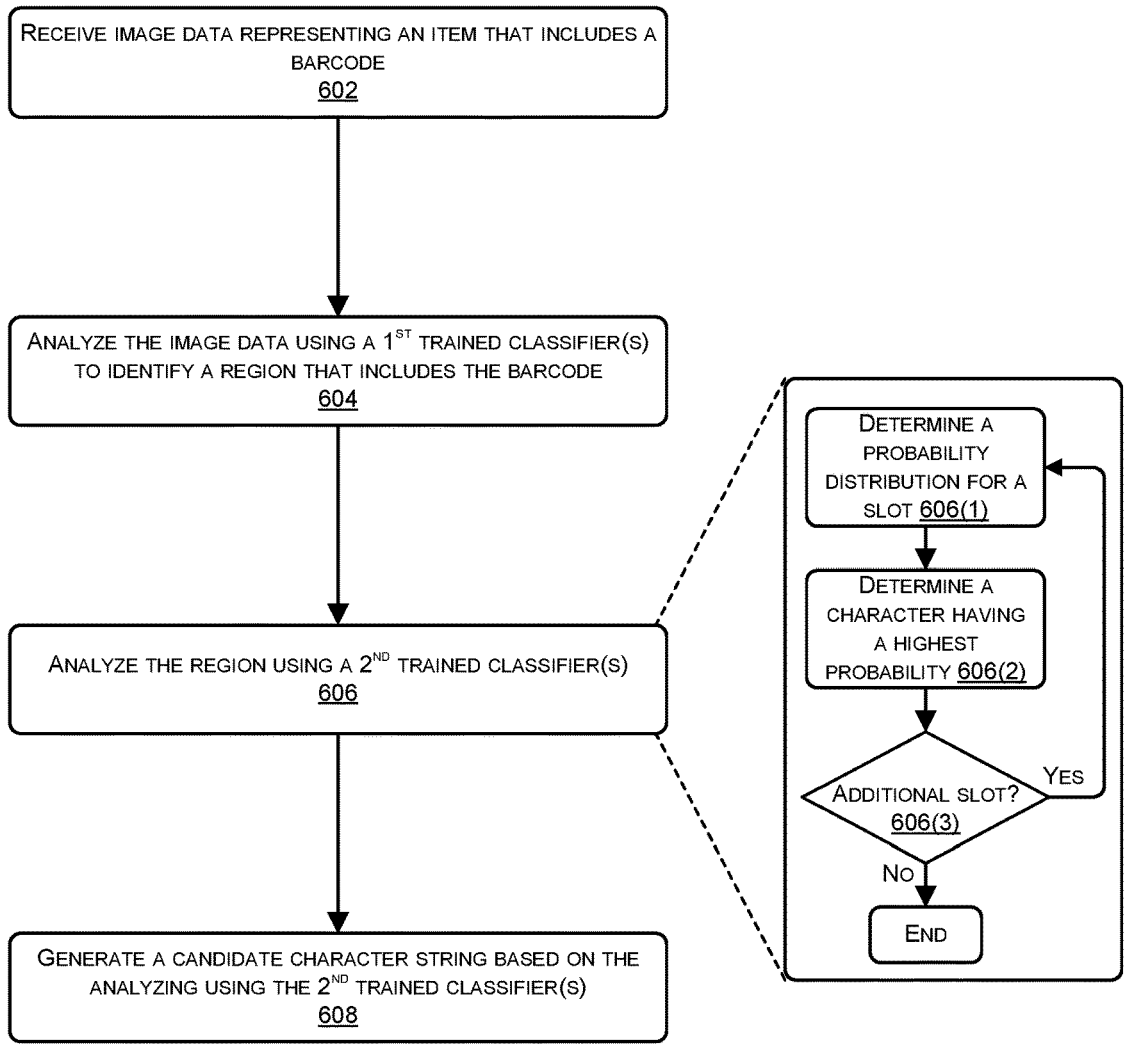
FIG. 6 illustrates a flow diagram of an example process for generating a candidate character string corresponding a barcode associated with an item.

FIG. 6 illustrates a flow diagram of an example process 600 for generating a candidate character string corresponding a barcode associated with an item.

At an operation 602, a system, such as one or more of the system(s) 400 described above, may receive image data representing an item that includes a barcode. As described above, this image data may be generated by a camera on a tote 104, an overhead camera, a camera on a shelf or other inventory location, or the like. At an operation 604, the system may analyze the image data to identify a region of the image data corresponding to the barcode. This may include applying one or more first trained classifiers to the image data, which may have been trained using supervised learning to identify the presence of barcodes in image data.

At an operation 604, the system may analyze the region using one or more second trained classifiers. As illustrated, this operation may include one or more sub-operations. At a sub-operation 606(1), the system may determine a probability distribution for a slot of a barcode using a second trained classifier. As described above, the probability distribution may indicate a respective probability that the slot of the barcode represents a respective value of a set of known values, such as the numbers zero (0) through nine (9). A sub-operation 606(2) represents determine, from the probability distribution, a character (e.g., a number, letter, symbol, etc.) having a highest probability for that slot. An a sub-operation 606(3), the system determines whether the barcode is associated with any additional slots. If so, then the sub-operations repeat until each slot has been analyzed.

Finally, at an operation 608, the system determines a candidate character string based on the analyzing of the region of the image data using the one or more second trained classifiers. In some instances, the candidate character string comprises those digits having the highest respective probabilities for each respective slot, as determine at sub-operation 606(2).

Figure 7:
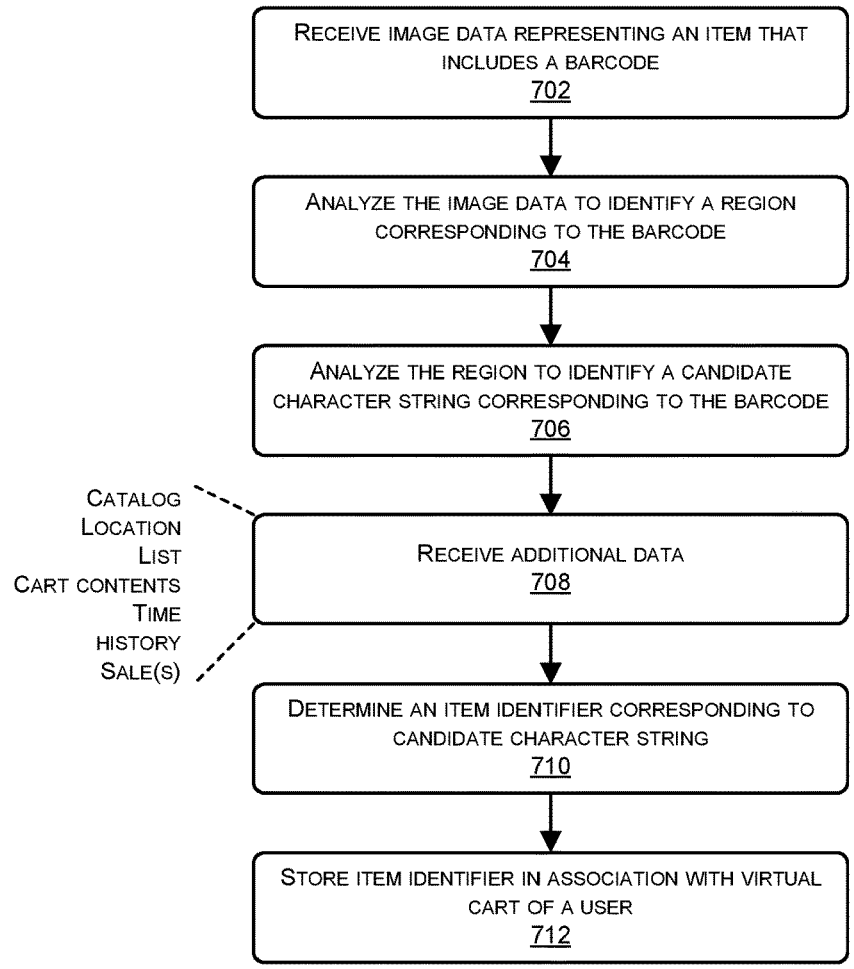

FIG. 7 illustrates a flow diagram of another example process 700 for identifying an item using a candidate character string determined by one or more trained classifiers and additional data, such as a location of a tote in a facility, a list associated with a user, and/or the like.

At an operation 702, a system, such as one or more of the system(s) 400 described above, may receive image data representing an item that includes a barcode. As described above, this image data may be generated by a camera on a tote 104, an overhead camera, a camera on a shelf or other inventory location, or the like. In some instances, this image data comprises images captured over time by multiple cameras, a single camera at a single time, or the like.

At an operation 704, the system may analyze the image data to identify a region of the image data corresponding to the barcode. This may include applying one or more first trained classifiers to the image data, which may have been trained using supervised learning to identify the presence of barcodes in image data.

At an operation 706, the system may analyze the identified region to identify a candidate character string corresponding to the barcode. This may include generating, for each slot of the barcode, a probability distribution indicating a respective probability that the slot represents a character of a predefined number of known characters. In some instances, the system uses one or more second classifiers having been trained using supervised learning to identify a respective probability that each respective slot of a barcode represents a digit from zero (0) to nine (9).

At an operation 708, the system may receive one or more pieces of additional data, such as a location of the tote 104, a shopping list of a user, current contents of the virtual cart of the user, a current time or day or season, a transaction history of the user, current promotions or sales at the facility, weight data indicating a weight of the item, appearance data indicating an appearance of the item, and/or the like. In some instances, the additional data may also comprise catalog information indicating items currently available for acquisition within the facility.

At an operation 710, the system may determine an item identifier corresponding to the candidate character string based at least in part on the candidate character string determined at the operation 706 and the additional data received at 708. In some instances, the candidate character string and the additional data may be used to generate an ordered list indicating item identifiers and corresponding confidence levels of the respective items. As described above, each confidence level may indicate a likelihood that the corresponding item identifier corresponds to the item represented in the image data. In some instances, the item identifier determined at the operation 710 may comprise the item identifier having the highest confidence level from the ordered list. Further, it is to be appreciated that the item identifier may comprise the actual barcode (e.g., numeric string) of the item, an identifier of the item in a catalog of the facility, a name of the item, or any other identifying information. Finally, at an operation 712, the system may store the item identifier in association with the virtual cart of the user.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
receiving first image data from a first camera mounted to a shopping cart;
analyzing the first image data to identify a user profile;
receiving second image data from a second camera mounted to the shopping cart, the second image data representing an item, wherein the second image data includes identifying information printed on the item;
analyzing the second image data to identify first data corresponding to the identifying information;
receiving second data for identifying the item, the second data based at least in part on the user profile; and
determining an item identifier corresponding to the item based at least in part on the first data and the second data.

2. The method as recited in claim 1, wherein:
the identifying information comprises a barcode;
the first data comprises a candidate character string corresponding to the barcode; and
the determining comprises determining the item identifier corresponding to the item based at least in part on the candidate character string and the second data.

3. The method as recited in claim 1, wherein the analyzing comprises:
analyzing the second image data to identify a region of the second image data corresponding to the identifying information; and
analyzing the region of the second image data to identify the first data corresponding to the identifying information.

4. The method as recited in claim 3, wherein:
the analyzing the second image data to identify the region of the second image data comprises analyzing the second image data using a first trained classifier; and
the analyzing the region of the second image data to identify the first data corresponding to the identifying information comprises analyzing the region of the second image data using one or more second trained classifiers.

5. The method as recited in claim 1, wherein the the second camera generates the second image data as the item is placed into the shopping cart.

6. The method as recited in claim 1, wherein the receiving the second data comprises receiving an indication of current contents of a virtual cart associated with the user profile.

7. The method as recited in claim 1, further comprising:
determining a confidence level that the item identifier corresponds to the item based at least in part on: (i) a distance between an inventory location associated with the item identifier in the facility and the first location, and (ii) a similarity between the item identifier and the first data.

8. The method as recited in claim 1, wherein the receiving the second data comprises receiving an indication of one or more items on a list associated with the user profile.

9. The method as recited in claim 1, wherein the receiving the second data comprises receiving additional data indicating at least one of a current time of day or a previous item acquired by a user associated with the user profile.

10. The method as recited in claim 1, wherein the item identifier comprises a first item identifier, and further comprising:
determining a first set of candidate item identifiers using the first data, the first set of candidate item identifiers including the first item identifier; and determining a second set of candidate item identifiers using the second data, the second set of candidate item identifiers including the first item identifier;

and wherein the determining the item identifier comprises determining the item identifier corresponding to the item based at least in part on the first set of candidate item identifiers and the second set of candidate item identifiers.

11. A shopping cart, comprising:

a first camera mounted to the shopping cart;

a second camera mounted to the shopping cart;

one or more processors; and one or more non-transitory computer-readable media storing computer-executable instructions that, when executed, cause the one or more processors to perform acts comprising:

receiving first image data from the first camera;

analyzing the first image data to identify a user profile;

receiving second image data from the second camera, the second image data representing an item, wherein the second image data includes identifying information printed on the item;

analyzing the second image data to identify first data corresponding to the identifying information;

receiving second data for identifying the item, the second data based at least in part on the user profile; and determining an item identifier corresponding to the item based at least in part on the first data and the second data.

12. The shopping cart as recited in claim 11, wherein:

the identifying information comprises a barcode;

the first data comprises a candidate character string corresponding to the barcode; and the determining comprises determining the item identifier corresponding to the item based at least in part on the candidate character string and the second data.

13. The shopping cart as recited in claim 11, wherein the analyzing comprises:

analyzing the second image data to identify a region of the second image data corresponding to the identifying information; and analyzing the region of the second image data to identify the first data corresponding to the identifying information.

14. The shopping cart as recited in claim 13, wherein:

the analyzing the second image data to identify the region of the second image data comprises analyzing the second image data using a first trained classifier; and the analyzing the region of the second image data to identify the first data corresponding to the identifying information comprises analyzing the region of the second image data using one or more second trained classifiers.

15. The shopping cart as recited in claim 11, wherein the second camera generates the second image data as the item is placed into the shopping cart.

16. The shopping cart as recited in claim 11, wherein the receiving the second data comprises receiving an indication of current contents of a virtual cart associated with the user profile.

17. The shopping cart as recited in claim 11, wherein:

the one or more computer-readable non-transitory computer-readable media further store computer-executable instructions that, when executed, cause the one or more processors to perform an act comprising determining a confidence level that the item identifier corresponds to the item based at least in part on: (i) a distance between an inventory location associated with the item identifier in the facility and the first location, and (ii) a similarity between the item identifier and the first data.

18. The shopping cart as recited in claim 11, wherein the receiving the second data comprises receiving an indication of one or more items on a list associated with the user profile.

19. The shopping cart as recited in claim 11, wherein the receiving the second data comprises receiving additional data indicating at least one of a current time of day or a previous item acquired by a user associated with the user profile.

20. The shopping cart as recited in claim 11, wherein the item identifier comprises a first item identifier, and the one or more non-transitory computer-readable media further store computer-executable instructions that, when executed, cause the one or more processors to perform acts comprising:

determining a first set of candidate item identifiers using the first data, the first set of candidate item identifiers including the first item identifier; and determining a second set of candidate item identifiers using the second data, the second set of candidate item identifiers including the first item identifier;

and wherein the determining the item identifier comprises determining the item identifier corresponding to the item based at least in part on the first set of candidate item identifiers and the second set of candidate item identifiers.

* * * * *

UNITED STATES PATENT AND TRADEMARK OFFICE
CERTIFICATE OF CORRECTION

PATENT NO. : 11,328,147 B1
APPLICATION NO. : 17/213031
DATED : May 10, 2022
INVENTOR(S) : Ejaz Ahmed et al.

It is certified that error appears in the above-identified patent and that said Letters Patent is hereby corrected as shown below:

In the Claims

Column 28, Line 41, change "the the" to -- the --.

Signed and Sealed this
Fourteenth Day of June, 2022

Katherine Kelly Vidal
*Director of the United States Patent and Trademark Office*